United States Patent
Yun

(10) Patent No.: US 10,854,884 B2
(45) Date of Patent: Dec. 1, 2020

(54) METHOD FOR MANUFACTURING MEMBRANE ELECTRODE ASSEMBLY FOR HYDROGEN FUEL CELL USING TWO TYPES OF BINDERS, AND MEMBRANE ELECTRODE ASSEMBLY MANUFACTURED BY THE METHOD

(71) Applicants: HYUNDAI MOTOR COMPANY, Seoul (KR); KIA MOTORS CORPORATION, Seoul (KR)

(72) Inventor: Sukhwan Yun, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 127 days.

(21) Appl. No.: 15/831,103

(22) Filed: Dec. 4, 2017

(65) Prior Publication Data
US 2018/0337409 A1    Nov. 22, 2018

(30) Foreign Application Priority Data
May 18, 2017    (KR) .................... 10-2017-0061496

(51) Int. Cl.
*H01M 4/88* (2006.01)
*H01M 4/86* (2006.01)
(Continued)

(52) U.S. Cl.
CPC ....... *H01M 4/8882* (2013.01); *H01M 4/8668* (2013.01); *H01M 4/8814* (2013.01);
(Continued)

(58) Field of Classification Search
CPC ............. H01M 4/8668; H01M 4/8828; H01M 4/8882; H01M 4/8814; H01M 8/1004; H01M 2008/1095
See application file for complete search history.

(56) References Cited

U.S. PATENT DOCUMENTS

2002/0192548 A1* 12/2002 Schaefer ................. B30B 5/06
                                                            429/209
2008/0274387 A1* 11/2008 Hori ..................... H01M 4/8605
                                                            429/483
(Continued)

FOREIGN PATENT DOCUMENTS

KR     10-1101497 B1    1/2012
KR     10-1127343 B1    7/2012
(Continued)

OTHER PUBLICATIONS

Jones, Perfluorosulfonic acid membranes for Fuel Cell and Electrolyser Application, in Material Matters, vol. 10, No. 3, pp. 88-94 (2015) (Year: 2015).*
(Continued)

*Primary Examiner* — Michael N Orlando
*Assistant Examiner* — Christopher W Raimund
(74) *Attorney, Agent, or Firm* — Morgan, Lewis & Bockius LLP

(57) ABSTRACT

A method of manufacturing a membrane electrode assembly for hydrogen fuel cells includes mixing an electrode binder with a catalyst, followed by dispersing and thermal treatment, to prepare an electrode slurry, coating release paper with the electrode slurry to produce an electrode, and bonding the release paper-coated electrode to an electrolyte membrane, followed by thermal treatment, to perform electrode-membrane bonding.

14 Claims, 1 Drawing Sheet

(51) Int. Cl.
*H01M 8/1004* (2016.01)
*H01M 8/1018* (2016.01)

(52) U.S. Cl.
CPC ....... *H01M 4/8828* (2013.01); *H01M 8/1004* (2013.01); *H01M 2008/1095* (2013.01)

(56) References Cited

U.S. PATENT DOCUMENTS

| | | | | |
|---|---|---|---|---|
| 2012/0046161 | A1* | 2/2012 | Ball | C22C 1/002 502/184 |
| 2013/0157169 | A1* | 6/2013 | Madden | H01M 4/8652 429/482 |
| 2013/0330652 | A1* | 12/2013 | Suchsland | H01M 8/1007 429/482 |
| 2014/0261981 | A1* | 9/2014 | Houghtaling | H01M 4/8825 156/182 |

FOREIGN PATENT DOCUMENTS

| | | |
|---|---|---|
| KR | 10-2014-0018882 A | 2/2014 |
| KR | 10-2016-0071800 A | 6/2016 |
| KR | 10-2016-0084182 A | 7/2016 |

OTHER PUBLICATIONS

Miyatake, "Membrane Electrolytes, from Perfluorosulfonic acid (PFSA) to Hydrocarbon Iononners", Encycl. of Sustainability Science and Tech., pp. 1-32 (2015). (Year: 2015).*

Osborn et al., "Glass Transition Temperature of Perfluorosulfonic Acid Ionomers", Macromolecules, vol. 40, No. 10 (2007). (Year: 2007).*

Giancola et al., "Study of Annealed Aquivion® Iononners with the INCA Method", Membranes 9, 134, Oct. 17, 2019. (Year: 2019).*

* cited by examiner

METHOD FOR MANUFACTURING MEMBRANE ELECTRODE ASSEMBLY FOR HYDROGEN FUEL CELL USING TWO TYPES OF BINDERS, AND MEMBRANE ELECTRODE ASSEMBLY MANUFACTURED BY THE METHOD

CROSS-REFERENCE TO RELATED APPLICATION

This application is based on and claims, under 35 U.S.C. § 119(a), the benefit of priority to Korean Patent Application No. 10-2017-0061496 filed on May 18, 2017 with the Korean Intellectual Property Office, the entire contents of which are incorporated herein by reference.

TECHNICAL FIELD

The present disclosure relates to a method of manufacturing a membrane electrode assembly for hydrogen fuel cells. More particularly, the present disclosure relates to the method of manufacturing the membrane electrode assembly which can improve interfacial bonding strength of the membrane electrode assembly and thus maintain mechanical robustness and delay deterioration in performance.

BACKGROUND

A membrane electrode assembly (MEA) is exposed to a temperature of 0° C. to 100° C. due to heating or cooling in a stack when a fuel cell is operated. On the contrary, the MEA may be exposed to a temperature below zero due to the surrounding environment when a fuel cell is not operated. Accordingly, the MEA may be exposed to a wide range of temperature from −40° C. to 150° C.

The MEA has a configuration in which an electrolyte membrane is bonded to an electrode. The MEA includes as few as three layers and as many as five layers. The three-layer structure MEA includes a cathode, an electrolyte membrane and an anode, wherein the five-layer structure MEA includes a cathode, an electrolyte membrane, a reinforced layer filled with ionomer, an electrolyte membrane and an anode. The three-layer structure MEA has two interfaces and the five-layer structure MEA has four interfaces.

In this regard, as described above, the MEA shrinks and expands depending on temperature change. In this process, delamination occurs at the MEA interface due to shrinkage and expansion. This delamination greatly deteriorates durability of the MEA.

In addition, fuel cells undergo deterioration in performance under harsh (occurrence of freezing/thawing) conditions when vehicles run. The level of deterioration is greatly affected by the (electrode-membrane) interfacial bonding strength of the MEA.

Considering a conventional method for manufacturing this MEA, two electrodes (a cathode and an anode) and an electrolyte membrane are bonded to each other by pressing at a high temperature of 50° C. or higher. Bonding is carried out using a plate-type hot press or a roll press. The finished MEA is thermally treated at a temperature of 100° C. or higher. The thermal treatment is carried out using a convection oven or a plate-type hot press.

In order to manufacture an MEA, thermal treatment is incorporated in each process. So as to manufacture an electrode, additional dispersion and thermal treatment processes are used to improve the dispensability of a catalyst and a binder. At this time, thermal treatment temperature has an influence on crystallinity of the electrode binder. When a temperature not lower than an α-transition temperature (Tα) of an electrode binder is applied after uniformly coating the catalyst/support, the structure of the catalyst-support-binder becomes robust, but crystallinity of the binder is provided under the condition that the morphology of the binder is changed, thus causing a problem of lowering interfacial bonding strength upon bonding of the electrode-membrane.

It is necessary that the temperature at which the electrode is bonded to the membrane by decal (release transfer) is not higher than Tα of the electrolyte membrane so that the crystallinity of the electrolyte membrane can be maintained. At this time, a temperature which is higher than Tα of an electrode binder should be applied in order to improve ease of electrode-membrane bonding and interfacial bonding strength. In addition, thermal treatment involved in the post-process after the electrode-membrane bonding is conducted at a temperature not less than Tα of the electrolyte membrane and the electrode binder in order to improve interfacial bonding strength. However, in the process of manufacturing an electrode, the crystallinity of the binder is already increased. For this reason, there is a limitation on improving interfacial bonding strength.

Meanwhile, Korean Patent Laid-open No. 2014-0018882 discloses a negative electrode for secondary batteries which can inhibit expansion of a negative electrode involved in charge/discharge and realize a secondary battery capable of maintaining capacity in spite of being stored under high temperature environments, a slurry composition for negative electrodes for manufacturing the negative electrode for secondary batteries and a method for manufacturing a negative electrode for secondary batteries, and a secondary battery including the negative electrode for secondary batteries. However, this patent is far from the solution to the problems of the MEA described above.

Accordingly, there is an increasing need for research on manufacturing methods which can ensure robustness and ease of electrode-membrane bonding as well as improve interfacial bonding strength.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with the prior art.

Accordingly, it is one object of the present disclosure to provide a method of manufacturing a membrane electrode assembly which can improve the interfacial bonding strength of the membrane electrode assembly, maintain mechanical robustness and delay deterioration in performance.

In one aspect, the present disclosure provides a method of manufacturing a membrane electrode assembly for hydrogen fuel cells including mixing an electrode binder with a catalyst, followed by dispersing and thermal treatment, to prepare an electrode slurry, coating release paper with the electrode slurry to produce an electrode, and bonding the release paper-coated electrode to an electrolyte membrane, followed by thermal treatment, to perform electrode-membrane bonding, wherein the electrode binder includes two types of ionomers having different α-transition temperatures, the thermal treatment in the step of preparing the electrode slurry is carried out at a temperature between a α-transition temperature of an ionomer having a relatively high α-transition temperature and a α-transition temperature of an ionomer having a relatively low α-transition temperature, among the ionomers having different α-transition temperatures, and the thermal treatment in the step of the electrode-membrane bonding is carried out at a temperature not less than the α-transition temperature of the ionomer having the relatively high α-transition temperature, among the ionomers having different α-transition temperatures.

The ionomer may be a perfluorosulfonic acid (PFSA)-based ionomer. In addition, among the ionomers having different α-transition temperatures, the α-transition temperature of the ionomer having a relatively high α-transition temperature may be higher than 140° C. and the α-transition temperature of the ionomer having a relatively low α-transition temperature may be lower than 120° C.

Meanwhile, the thermal treatment in the step of preparing the electrode slurry may be carried out at 130° C. and the thermal treatment in the step of the electrode-membrane bonding may be carried out at 150° C.

In addition, among the ionomers having different α-transition temperatures, the ionomer having a relatively high α-transition temperature may function to coat and crystallize catalyst/support, and the ionomer having a relatively low α-transition temperature may function to improve interfacial bonding strength upon catalyst/support coating and electrode-membrane bonding.

Other aspects and preferred embodiments of the invention are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

DETAILED DESCRIPTION

Figure 1:
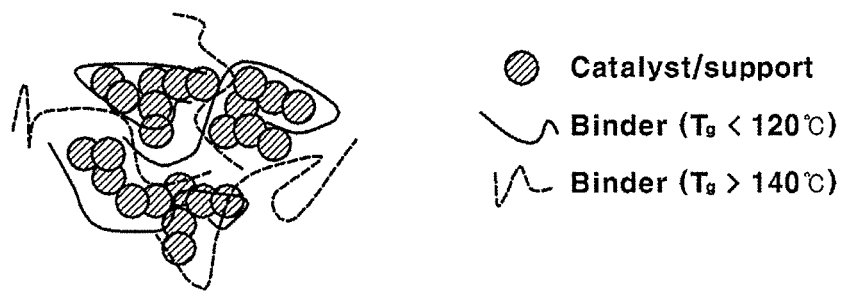
FIG. 1 is an image showing two types of ionomer binders having different α-transition temperatures applied to a catalyst/support according to one embodiment of the present disclosure.
Figure 2:
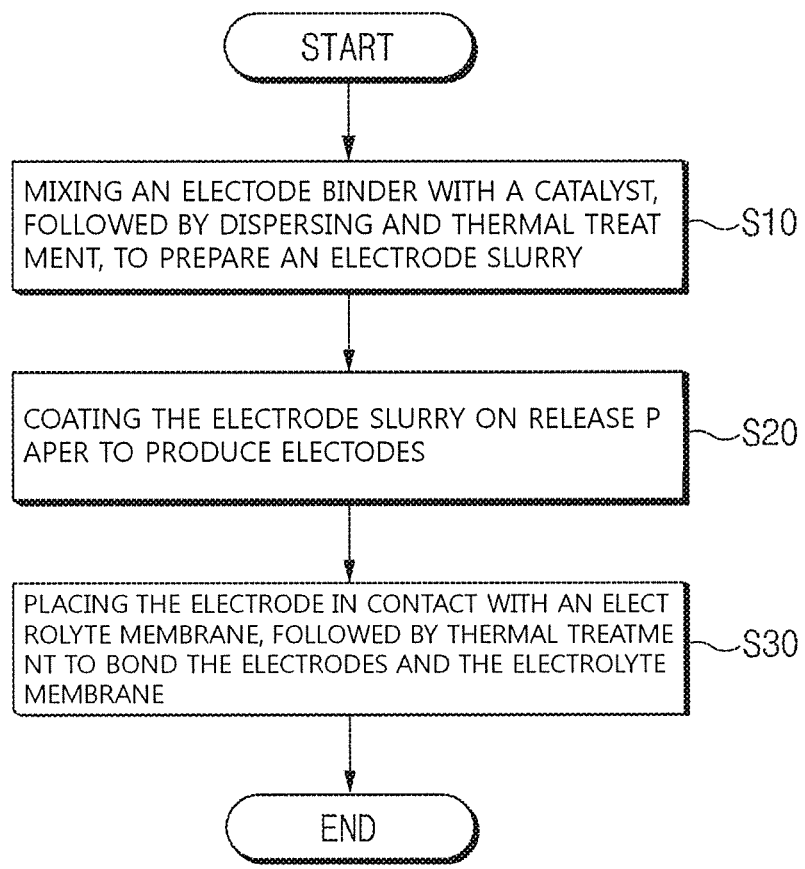
FIG. 2 is a flow chart of a method of manufacturing a membrane electrode assembly for hydrogen fuel cells.

Hereinafter, reference will be made in detail to various embodiments of the present disclosure, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims. In the following description of the present disclosure, detailed descriptions of known functions and configurations incorporated herein will be omitted when it may obscure the subject matter of the present disclosure.

The present disclosure provides a method of manufacturing a membrane electrode assembly for hydrogen fuel cells which includes: mixing an electrode binder with a catalyst, followed by dispersing and thermal treatment, to prepare an electrode slurry S10; coating release paper with the electrode slurry to produce an electrode S20; and bonding the release paper-coated electrode to an electrolyte membrane, followed by thermal treatment, to conduct electrode-membrane bonding S30, wherein the electrode binder includes two types of ionomers having different α-transition temperature (Tα), the thermal treatment in the step of preparing the electrode slurry is carried out at a temperature between a Tα of an ionomer having a relatively high Tα and a Tα of an ionomer having a relatively low Tα, among the ionomers having different Tαs, and the thermal treatment in the step of the electrode-membrane bonding is carried out at a temperature not less than the Tα of the ionomer having the relatively high Tα, among the ionomers having different Tαs.

Hereinafter, a method of manufacturing a membrane electrode assembly for hydrogen fuel cells according to an embodiment will be described in more detail.

According to a conventional method, when a temperature not lower than an electrode binder Tα is applied after uniformly coating the catalyst/support, the structure of the catalyst-support-binder becomes robust, but crystallinity of the binder is provided under the condition that the morphology of the binder is changed, thus causing a problem of lowering interfacial bonding strength upon bonding of the electrode-membrane. In addition, it is necessary that the temperature at which the electrode is bonded to the membrane by decal (release transfer) is not higher than the Tα of the electrolyte membrane so that the crystallinity of the electrolyte membrane can be maintained. At this time, a temperature which is higher than Tα of an electrode binder should be applied in order to improve ease of electrode-membrane bonding and interfacial bonding strength. Moreover, thermal treatment involved in the post-process after the electrode-membrane bonding is conducted at a temperature not less than Tα of the electrolyte membrane and the electrode binder in order to improve interfacial bonding strength. However, in the process of manufacturing an electrode, the crystallinity of the binder is already improved. For this reason, there is a limitation on improving interfacial bonding strength.

Accordingly, the present inventors found from testing that electrode-membrane bonding can be facilitated, mechanical robustness can be maintained due to improved interfacial bonding strength of the membrane electrode assembly, and deterioration in performance can be retarded by using different two types of ionomers having different Tαs in the process of manufacturing a membrane electrode assembly for hydrogen fuel cells, thereby completing the present disclosure.

Regarding the method of manufacturing a membrane electrode assembly for hydrogen fuel cells according to one embodiment of the present disclosure, an electrode binder includes two types of ionomers having different Tαs, and the thermal treatment in the step of preparing the electrode slurry is carried out at a temperature between a Tα of an ionomer having a relatively high Tα and a Tα of an ionomer having a relatively low Tα, among the ionomers having different Tαs, and the thermal treatment in the process of the electrode-membrane bonding is carried out at a temperature not less than the Tα of the ionomer having the relatively high Tα, among the ionomers having different Tαs.

In a conventional method, in the process of preparing an electrode slurry (catalyst+support+binder), catalyst/support was coated at a temperature not less than the electrode binder Tα. At this time, crystallinity of the binder is created under the condition that the morphology of the binder is changed, thus causing a problem of lowering interfacial bonding strength, upon bonding of the electrode-membrane, which is disadvantageous under freezing and thawing environments.

In an attempt to solve these problems, there is a method of improving binding strength by changing the roughness of the bonding surface to a level of several nanometers in order to produce an electrode with excellent interfacial bonding strength. However, this method has a drawback of considerably poor applicability to mass-production.

According to one embodiment of the present disclosure, it is possible to provide a method of manufacturing a membrane electrode assembly for hydrogen fuel cells which can ensure robustness and ease of electrode-membrane bonding as well as improve interfacial bonding strength by using ionomers having different thermal properties (Tα) as electrode binders.

Meanwhile, the ionomer may be a fluorine-based ionomer, preferably a perfluorosulfonic acid (PFSA)-based ionomer.

In generally, the Tα of a PFSA-based ionomer is determined by the length of a side-chain attached to a main chain and, as the length of the side-chain increases, the Tα decreases. In addition, the amount of side-chain attached to the main chains well as the length of side-chain determines equivalent EW) which also affects a Tα.

According to the present invention, specifically, a mixture of PFSA ionomers having different Tα is applied as the electrode binder, the thermal treatment in the step of preparing the electrode slurry is carried out at a temperature between a Tα of an ionomer having a relatively high Tα and a Tα of an ionomer having a relatively low Tα, among the ionomers having different Tαs, and the thermal treatment in the process of electrode-membrane bonding is carried out at a temperature not less than the Tα of the ionomer having the relatively high Tα, among the ionomers having different Tαs.

FIG. 1 is an image showing two types of ionomer binders having different Tαs applied to a catalyst/support according to one embodiment of the present disclosure.

The ionomer having a relatively high Tα, among the ionomers having different Tαs, acquires crystallinity by thermal treatment in the process of preparing an electrode slurry. At this time, the ionomer having a relatively high Tα functions to strongly bind the catalyst-support-binder structure.

Meanwhile, the ionomer having a relatively low Tα is crystallized by thermal treatment in the process of electrode-membrane bonding. Such an ionomer functions to improve interfacial bonding strength upon catalyst-support coating and electrode-membrane bonding.

The Tα of the ionomer having a relatively high Tα, among the ionomers having different Tαs, may be higher than 140° C.

In addition, the Tα of the ionomer having a relatively low Tα, among the ionomers having different Tαs, may be lower than 120° C.

When both the ionomer having a Tα lower than 120° C. and the ionomer having a Tα higher than 140° C. are used, thermal treatment in the step of preparing the electrode slurry is preferably performed at 130° C.

In addition, when both the ionomer having a Tα lower than 120° C. and the ionomer having a Tα higher than 140° C. are used, thermal treatment in the process of electrode-membrane bonding is preferably performed at 150° C.

As described above, the ionomer having a relatively high Tα, among the ionomers having different Tαs acquires crystallinity by thermal treatment in the step of preparing the electrode slurry. Accordingly, the ionomer having a relatively high Tα functions to strongly bind the catalyst-support-binder structure. Meanwhile, the ionomer having a relatively low Tα is crystallized by thermal treatment in the step of electrode-membrane bonding. Accordingly, such an ionomer performs functions to improve interfacial bonding strength upon catalyst-support coating and electrode-membrane bonding.

As a result, by using two types of ionomers and controlling thermal treatment temperature, the bonding structure of the catalyst-support-binder can be reinforced so that robustness of the electrode can be ensured, the low-crystallinity ionomer contained in the electrode binder has relatively strong bonding strength so that the ease of electrode-membrane bonding can be improved, and interfacial bonding strength of the membrane electrode assembly is enhanced so that mechanical robustness can be maintained and deterioration in performance can be delayed.

Meanwhile, the same effects as described above can be obtained although replacing two types of ionomers having different Tαs with a thermoplastic ionomer and a thermosetting ionomer, respectively.

According to another embodiment of the present disclosure, provided are a membrane electrode assembly for hydrogen fuel cells produced by the method described above, and a hydrogen fuel cell including the same.

Meanwhile, a decal process, rather than direct coating, may be used for bonding to an electrode electrolyte membrane using a certain ionomer having a Tα lower than 120° C. (DuPont Corp., Nafion®, Tα: 105~115° C.) and a certain ionomer having a Tα higher than 140° C. (Solvay Corp., Aquivion®, Tα: about 140° C., ionomer based on hydrocarbon such as sulfonated polyetheretherketone or sulfonated polysulfone, Tα: 140~250° C.).

To produce an electrode, a platinum catalyst supported on carbon is mixed with two types of ionomers, followed by homogeneously dispersing. At this time, the total amount of ionomer is 20 to 40% (on a weight basis) with respect to the total weight of the dispersion. This dispersion is referred to as an "electrode slurry" and thermal treatment is incorporated in order to induce suitable bonding of the incorporated ionomer to the surface of the platinum catalyst supported on carbon and improve the molecular structural crystallinity of the ionomer. After the electrode slurry is completely dried, thermal treatment is conducted at a thermal treatment temperature of 130° C. for 30 minutes to 2 hours, so that the ionomer having a Tα lower than 120° C. can be sufficiently affected by the thermal treatment and the ionomer having a Tα higher than 140° C. can maintain the crystallinity. The electrode cake subjected to drying and thermal treatment is dispersed in an organic solvent (mix solution containing at least one solvent of water, ethanol and propanol), and a release film (PEN, PET, PI or the like) is directly coated with the electrode slurry thus formed and then dried, to produce a transferable electrode.

The electrode thus produced is transferred from release paper to the electrolyte membrane to produce a membrane-electrode assembly. In this case, the electrode is bonded to the electrolyte membrane at a pressure of 80 to 150 kgf and at 80 to 110° C. The ionomer having a Tα higher than 140° C. which did not undergo increase in crystallinity during initial thermal treatment (120° C.) is soft and thus provides an effect of improving interface bonding strength, as compared to the case of incorporating an ionomer with improved crystallinity. In order to further improve interfacial bonding strength between the electrode and the electrolyte membrane after the membrane-electrode bonding, thermal treatment is performed at 150 to 180° C. for 30 seconds to 5 minutes. At this time, by using a temperature higher than Tαs of the two types of ionomers, rubber-like property is imparted to the ionomer and, upon cooling, high crystallinity is imparted thereto, so that the interface bonding strength of the membrane-electrode as well as the mechanical robustness of the electrode can be improved.

As apparent from the foregoing, the membrane electrode assembly for hydrogen fuel cells manufactured by the method according to the present disclosure has a reinforced bonding structure of catalyst-support-binder, thus being effective in ensuring robustness and ease of electrode-membrane bonding, maintaining mechanical robustness based on improved interfacial bonding strength of electrode-membrane assembly and delaying deterioration in performance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly for hydrogen fuel cells comprising steps of:
    mixing an electrode binder comprising a first ionomer and a second ionomer with a catalyst,
    drying a resultant mixture
    performing a first thermal treatment to the resultant mixture to prepare an electrode slurry;
    coating the electrode slurry on release paper to produce electrodes;
    placing the electrode electrodes in contact with an electrolyte membrane; and
    performing a second thermal treatment to the electrode and the electrolyte membrane to bond them;
    wherein the first ionomer has a higher α-transition temperature than that of the second ionomer,
    the first thermal treatment is carried out at a temperature between the α-transition temperature of the first ionomer and the α-transition temperature of the second ionomer in presence of the first ionomer and the second ionomer for 30 minutes to 2 hours, and
    the second thermal treatment is carried out at a temperature not less than the α-transition temperature of the first ionomer.

2. The method according to claim 1, wherein the first ionomer or the second ionomer includes a perfluorosulfonic acid (PFSA)-based ionomer.

3. The method according to claim 1, wherein the α-transition temperature of the first ionomer having is higher than 140° C.

4. The method according to claim 1, wherein the α-transition temperature of the second ionomer is lower than 120° C.

5. The method according to claim 3, wherein the thermal treatment in the step of preparing the electrode slurry is carried out at 130° C.

6. The method according to claim 3, wherein thermal treatment in the step of the electrode-membrane bonding is carried out at 150° C.

7. A membrane electrode assembly for hydrogen fuel cells manufactured by the method according to claim 1.

8. A hydrogen fuel cell comprising the membrane electrode assembly according to claim 7.

9. A method of manufacturing a membrane electrode assembly for hydrogen fuel cells comprising steps of:
    mixing an electrode binder with a catalyst, followed by dispersing, drying and thermal treatment, to prepare an electrode slurry;
    coating the electrode slurry on release paper to produce electrodes; and
    placing the electrodes in contact with an electrolyte membrane, followed by thermal treatment, to bond the electrodes and the electrolyte membrane,
    wherein the electrode binder comprises a first ionomer and a second ionomer in an amount which is 20% to 40% of a total amount of the first and second ionomers with respect to a total weight of the electrode slurry,
    an α-transition temperature of the first ionomer is higher than an α-transition temperature of the second ionomer,
    the thermal treatment in the step of preparing an electrode slurry is carried out at a temperature between the α-transition temperature of the first ionomer and the α-transition temperature of the second ionomer for 30 minutes to 2 hours, and
    the thermal treatment in the step of bonding the electrodes and the electrolyte membrane is carried out at a temperature not less than the α-transition temperature of the first ionomer.

10. The method according to claim 9, wherein the thermal treatment in the step of bonding the electrodes and the electrolyte membrane is carried out at a temperature of 150° C. so that the second ionomer is crystallized by the thermal treatment in the step of bonding.

11. The method according to claim 9, wherein the α-transition temperature of the first ionomer is higher than 140° C.

12. The method according to claim 9, wherein the first ionomer or the second ionomer includes a perfluorosulfonic acid (PFSA)-based ionomer.

13. The method according to claim 9, wherein the α-transition temperature of the second ionomer is lower than 120° C.

14. The method according to claim 9, wherein the thermal treatment in the step of preparing the electrode slurry is carried out at 130° C.

* * * * *